United States Patent [19]

Rees et al.

[11] 4,259,056

[45] Mar. 31, 1981

[54] BOTTLE-MOLDING SYSTEM

[75] Inventors: Herbert Rees, Willowdale; Robert D. Schad, Schomberg, both of Canada

[73] Assignee: Husky Injection Molding Systems Limited, Ontario, Canada

[21] Appl. No.: 67,009

[22] Filed: Aug. 16, 1979

Related U.S. Application Data

[62] Division of Ser. No. 894,376, Apr. 7, 1978, Pat. No. 4,209,290.

[51] Int. Cl.$^3$ .............................................. B29C 17/07
[52] U.S. Cl. ................................. 425/533; 425/537; 425/541; 264/537
[58] Field of Search ............... 425/533, 537, 541, 534; 264/537, 538

[56] References Cited

U.S. PATENT DOCUMENTS

| 3,364,521 | 1/1968  | Valyi      | 425/533 X |
| 3,785,116 | 1/1974  | Munz et al.| 425/533 X |
| 3,819,314 | 6/1974  | Marcus     | 425/537 X |
| 3,851,030 | 11/1974 | Valyi      | 264/537 X |
| 4,047,874 | 9/1977  | Valyi      | 425/533   |
| 4,116,606 | 9/1978  | Valyi      | 425/533 X |

*Primary Examiner*—Jan H. Silbaugh

*Attorney, Agent, or Firm*—Karl F. Ross

[57] ABSTRACT

Preforms or parisons to be blow-molded into bottles are produced in cavities of a lower mold half of a vertical injection-molding machine with the aid of respective cores depending into these cavities from an upper mold half when the mold is closed. As the two mold halves separate, the parisons adhere to the respective cores from which they are subsequently discharged into respective nests of a transfer box or respective cells of a blow-molding unit interposed between these mold halves. In the first instance, the parisons are cooled by a circulating air stream while the transfer box is laterally withdrawn before the start of a new injection-molding cycle, the rigidified parisons being then released from their nests to drop into pockets of an underlying conveyor transporting them to a blow-molding station. In the second instance, the cores are hollow and descend with their parisons into the blow-molding cells whose split walls are closed around the cores by fluidic or mechanical means. There the parisons are inflated by air injected through the cores whereupon the finished bottles are extracted from these cells after the blow-molding unit has been laterally withdrawn and while a new injection cycle takes place.

2 Claims, 6 Drawing Figures

BOTTLE-MOLDING SYSTEM

This is a division of application Ser. No. 894,376, filed Apr. 7, 1978 now U.S. Pat. No. 4,209,290.

FIELD OF THE INVENTION

Our present invention relates to a system for producing bottles, e.g. of the soft-drink type, from thermoplastic material by a two-stage process involving the injection molding of parisons or preforms and the subsequent expansion thereof by blow-molding technique.

BACKGROUND OF THE INVENTION

Present-day injection-molding technology enables the simultaneous production of a group of thermoplastic preforms in as many mold cavities in an operating cycle of about 20 seconds. Upon discharge from the mold cavities, however, these preforms are still hot and therefore not sufficiently self-supporting to permit their transportation to an associated blow-molding station without prior cooling. Thus, the body of the preform—which is expanded in the blow-molding process—is generally of considerable wall thickness, e.g. on the order of 4 to 6 mm, thereby storing a substantial quantity of heat; this is not the case with the neck of the preform which does not undergo expansion and whose wall thickness therefore corresponds to that desired in the final product. If simple air cooling is used to solidify the preforms or parisons until they can be transported, their accumulation in the vicinity of the injection-molding machine would extend the operating cycle of that machine by about 50% with corresponding reduction of the production rate.

Suitable thermoplastic materials for the two-stage production of bottles for carbonated beverages or the like include polyesters, nitriles and polypropylene.

OBJECTS OF THE INVENTION

The general object of our present invention is to provide a system for producing such bottles by combined injection and blow molding in an efficient and economical manner.

A more particular object is to provide, in a plant in which the injection-molding and blow-molding stations are physically separated, simple means for cooling one of more bottle preforms, immediately upon their ejection from the cavities of the injection-molding machine, to enable their removal to the blow-molding station—or possibly to some intermediate storage facility—at their rate of production, preferably within a cycle of not more than 20 seconds.

Another more specific object of our invention is to provide, as an alternate solution to the problem of efficient handling, means for performing the injection-molding and blow-molding steps in one and the same machine with avoidance of the need for cooling, transporting and reheating the parisons.

SUMMARY OF THE INVENTION

In accordance with this invention we provide a vertical injection-molding machine having a lower mold portion with one or more cavities, an upper mold portion with as many elongate cores depending therefrom as there are cavities, and clamp means for relatively reciprocating the two mold portions, the lower one preferably remaining stationary. In a mold-open position, in which the two mold portions are separated by a gap, a horizontally movable carriage is insertable into this gap by drive means synchronized—e.g. by a programmer—with the clamp means. The carriage has as many compartments as there are mold cavities and cores, these compartments being respectively alignable with the cores on the upper mold portion in the insertion position of the carriage to enable the transfer of workpieces, adhering to the cores upon their extraction from the associated cavities, to the aligned compartments with the aid of stripper means coacting with the cores. The carriage is laterally withdrawn from the gap, by its drive means, before the start of the next injection-molding cycle whereupon the workpiece or workpieces are unloaded onto a conveyor disposed alongside the injection-molding machine at a level below the path of the carriage.

If the workpieces are parisons transformed into bottles in a separate blow-molding station, the carriage—referred to hereinafter as a transfer box—is connected to a source of cooling fluid (usually air) opening into a plenum chamber which encompasses the compartment or compartments thereof. In that instance, the carriage is advantageously provided with neck-engaging gripper means above the plenum chamber and retractable support means below that chamber, the gripper and support means being operable by respective actuators to engage the parisons stripped off the cores and to release them, after withdrawal of the transfer box, to the underlying conveyor.

Pursuant to another aspect of our invention, the compartment or compartments of the carriage are designed as blow-molding cavities (referred to hereinafter as cells, to distinguish them from the injection-molding cavities) in which the parisons are inflated, while still hot, by high-pressure gas admitted through the hollow cores which descend with the adhering parisons into the respective cells. After the blow-molding unit has been withdrawn, the finished bottles thus formed are removed by unloading means which may comprise one or more extraction members positively coupled with the upper mold portion for lowering onto or into the carriage during the mold-closing stroke. These extraction members are preferably supported, directly or indirectly, on the movable platen carrying the upper mold portion in order to descend toward the conveyor—while the machine performs the next blow-molding operation—before the bottles are released. Such descent will not be necessary if the bottles are unloaded directly through the bottom of the open blow mold, lying at a level close to that of the conveyor, in a manner comparable to the discharge of the parisons from a transfer box by retraction of the support means.

BRIEF DESCRIPTION OF THE DRAWING

The above and other features of our invention will now be described in detail with reference to the accompanying drawing in which.

SPECIFIC DESCRIPTION

Figure 1:
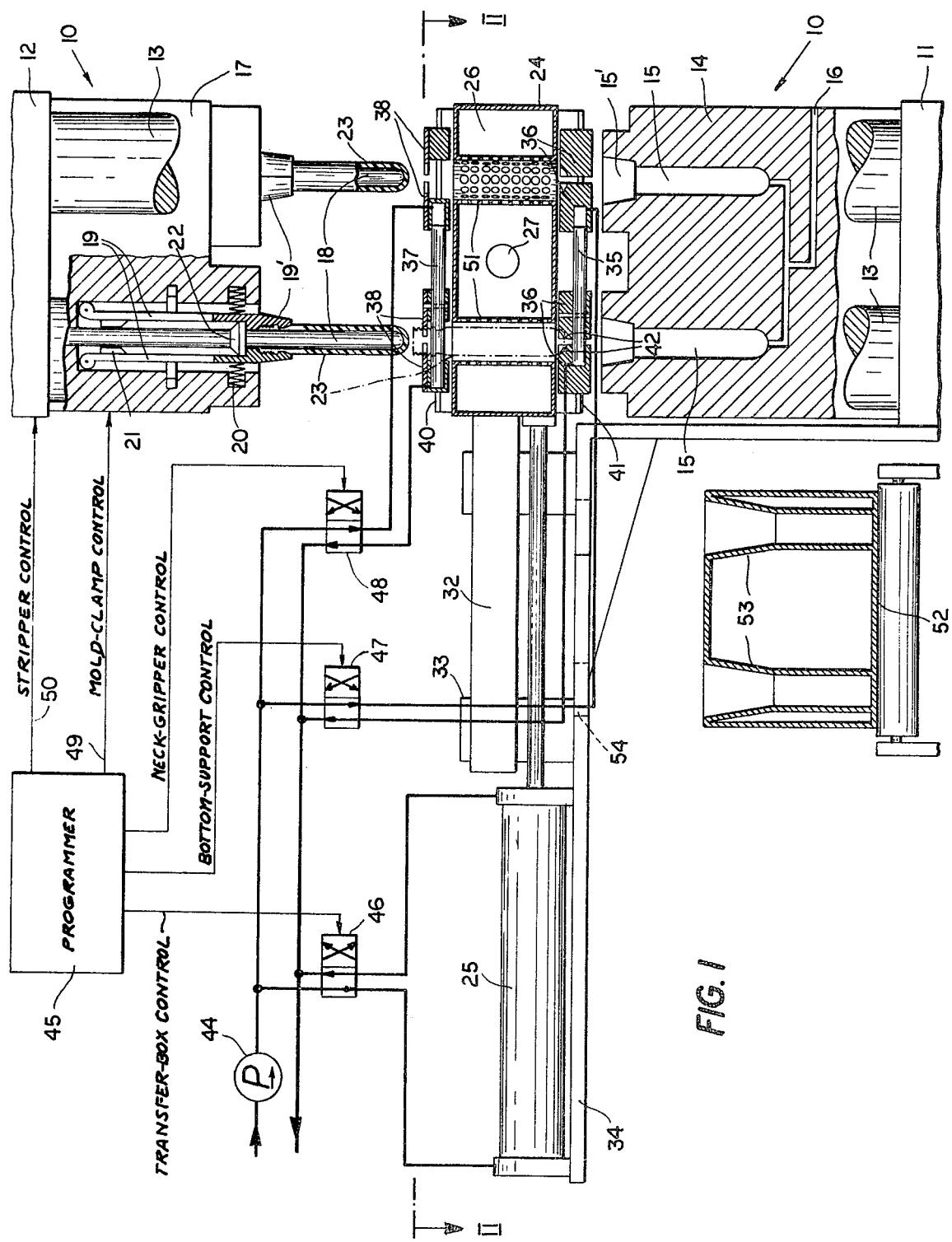
FIG. 1 is a somewhat diagrammatic side-elevational view, partly in section, of a vertical injection-molding machine provided with preform-cooling means according to our invention.
Figure 2:
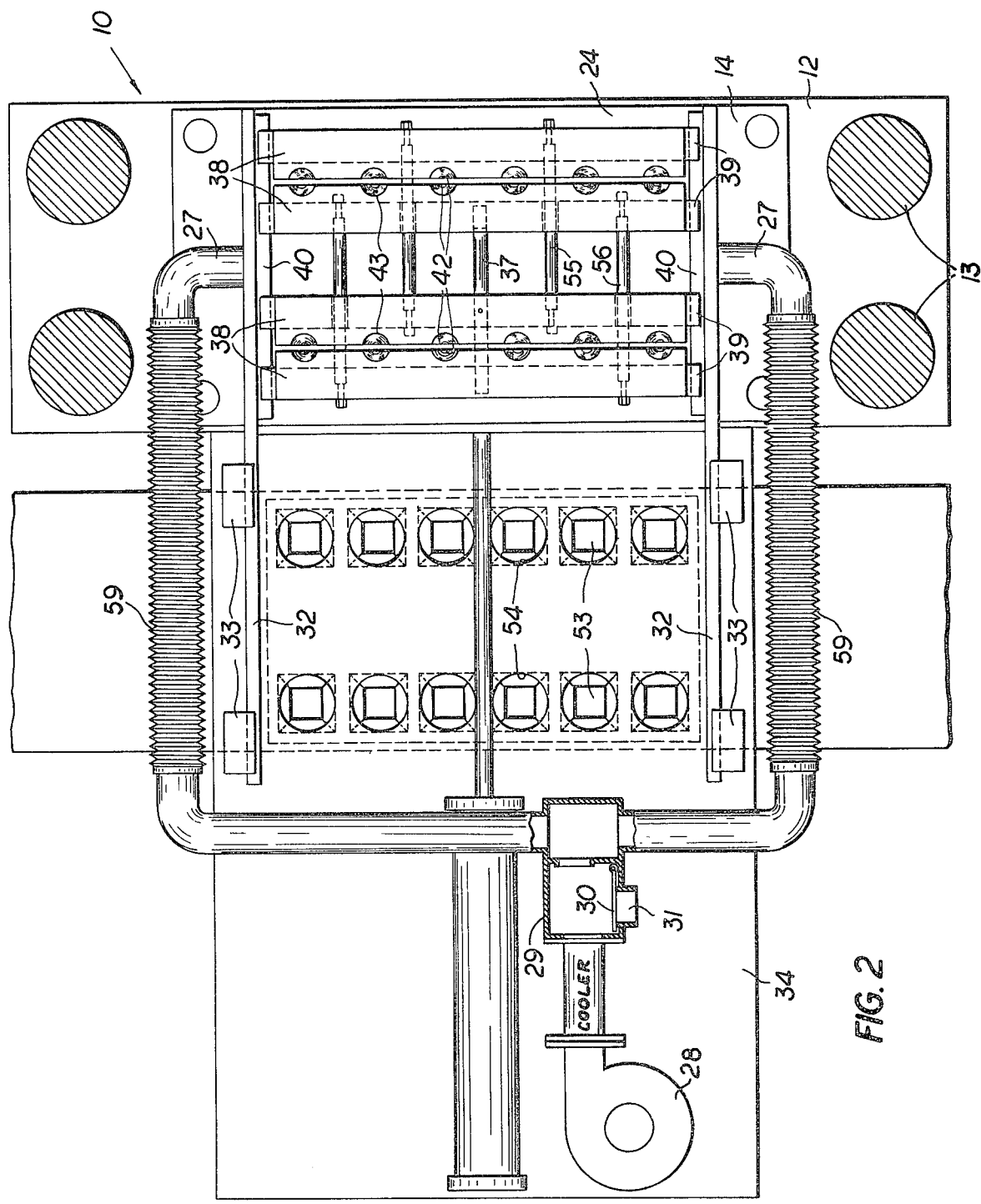
FIG. 2 is a partly sectional plan view of the assembly of FIG. 1 taken substantially along the line II—II thereof.

In FIGS. 1 and 2 we have shown a largely conventional upright injection-molding machine 10 comprising a stationary lower platen 11, a vertically reciprocable upper platen 12 guided by tie rods 13, a lower mold half 14 on platen 11 formed with cavities 15 and injection channels 16, an upper mold half 17 carried on platen 12, and a multiplicity of vertical, elongate cores 18 depending from mold half 17 in line with respective cavities 15. Each core 18 is embraced by a tubular stripper 19 longitudinally split into two halves which are pressed by springs 20 against the associated core and whose lower extremities, provided with semiannularly recessed and helically grooved inner surfaces, constitute neck rings 19' which enter recesses 15' in mold half 14 to serve as extensions of the corresponding mold cavities. The cores 18 are upwardly retractable, by conventional means not further illustrated, with reference to mold half 17 and strippers 19 whereby camming formations 21 on the stripper halves coact with a shoulder 22 on the associated core 18 so that the stripper halves are spread apart and release the neck of a molded parison or preform 23.

In accordance with our present invention, a transfer box 24 is horizontally reciprocable by a pneumatic jack 25 to move into and out of the gap formed between mold halves 14 and 17 after each injection-molding cycle. Transfer box 24 forms a rectangular plenum chamber 26 to which cooling air may be admitted via ports 27 formed in end walls defining the minor sides of the rectangle, these ports communicating with a blower 28 by way of a coupling head 29 provided with a damper 30. In the working position illustrated in FIG. 2, damper 30 obstructs a vent 31 while letting the air stream generated by the blower pass into the box 24 via heat exchangers 59 keeping that flow at a low temperature. In an alternate position of the damper, the air escapes ineffectually into the atmosphere. Box 24 is rigid with a pair of supporting rails 32 which are slidably received in guide blocks 33 fixedly mounted on a bed 34.

A pneumatic jack 35 underneath transfer box 24 is connected with two pairs of supporting jaws 36 which underlie the plenum chamber 26 while extending over substantially the full length of the box. Another pneumatic jack 37 above box 24 similarly controls two pairs of gripper jaws 38 which are substantially coextensive with supporting jaws 36 and rest on bars 39 slidably mounted on ledges 40 above plenum chamber 26. Similar ledges 41, coextensive with ledges 40, serve for the guidance of the supporting jaws. The latter jaws are provided along their confronting edges with complementary recesses 42 which, in their illustrated closure position, form upwardly concave seats for respective preforms 23. Gripper jaws 38 have semicircular cutouts 43 which, like seats 42, are centered on the axes of respective cores 18 and cavities 15 of machine 10 upon the insertion of transfer box 24 into the mold gap. Jack 37 acts upon the two inner jaws of the upper pairs 38 which are rigidly connected with the nonadjacent outer jaws by links 55 and 56, respectively. A similar linkage, not visible, interconnects the lower jaw pairs 36 to facilitate their joint displacement by jack 35.

Pneumatic fluid, supplied by a pump 44, operates the jacks 25, 35 and 37 under the control of a programmer 45 acting upon respective valves 46, 47 and 48. Programmer 45 also controls the injection of plastic material into cavities 15 and the motion of a conventional mold clamp, which raises and lowers the platen 12, as well as the aforementioned mechanism for the withdrawal of the cores 18 relative to the strippers 19; the mold clamp and the stripper mechanism have been represented by their control circuits diagrammatically indicated at 49 and 50. Damper 30 may also be controlled by the programmer 45 to interrupt the air flow into the box 24 during insertion of the empty transfer box into the mold gap and introduction of the hot parisons 23 into the plenum chamber 26 by the withdrawal of the cores 18 and the release of the parisons from the neck rings 19' at the end of the withdrawal stroke, as described above. It will be understood that such interruption of the air flow is necessary only if the cooling stream, exiting from plenum chamber 26 through the clearances provided between jaw pairs 36 and 38, has a tendency to interfere with the descent of the parisons into the plenum chamber. Otherwise, damper 30 and vent 31 could be omitted.

As further shown in FIG. 1, plenum chamber 26 is subdivided into a multiplicity of cooling nests (here twelve) by a corresponding number of perforated cylinders 51 which are centered upon the respective jaw axes and whose inner diameter exceeds the outer diameter of a parison to be accommodated therein. There is further shown a conveyor 52 forming a multiplicity of pockets 53 (again twelve in this instance) which are alignable with aperatures 54 in machine bed 34 to receive the cooled parisons 23 when the transfer box 24 has been withdrawn from the mold gap. Pockets 53 ensure the maintenance of the parisons in their vertical position, suitable for introduction into respective blow molds.

The operation of the system shown in FIGS. 1 and 2 will now be described with reference to FIG. 3.

Figure 3:
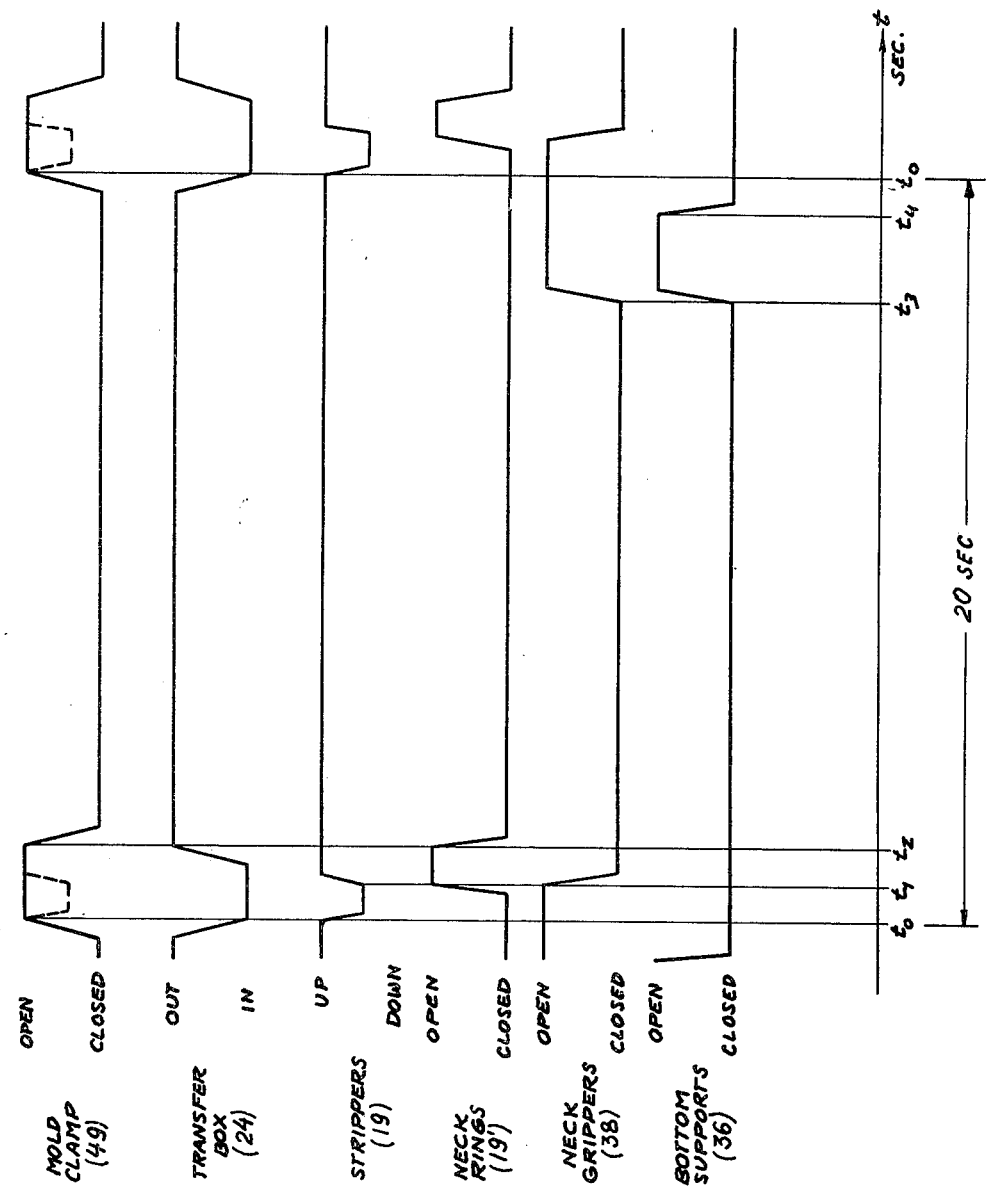
FIG. 3 is a timing diagram relating to the operation of the system shown in FIGS. 1 and 2.

The top graph of FIG. 3 shows the periodic opening and closure of the mold 14, 17 by the associated clamp drive represented in FIG. 1 by the programmer output 49. The mold opens at a time $t_0$, allowing for the insertion of the transfer box 24 as indicated in the second graph. The third graph shows the operation of the strippers 19 which are lowered at this instant, along with platen 12 and mold half 17, while the cores 18 are restrained by the programmer 45 (through control circuit 50) from following their descent. The neck rings 19' represented by the fourth graph are closed at this stage, as are the bottom supports 36 represented by the sixth graph, whereas the neck grippers 38 (fifth graph) are open to facilitate the introduction of the preforms or parisons 23 into the nests 51. It will be noted that, with the cores 18 in the position shown in FIG. 1, the parisons 23 are positively guided by the stationary cores over part of their length until the major portion of their body has entered the plenum chamber 26. At this instant, designated $t_1$ in FIG. 3, the neck rings 19' are cammed open and the parisons come to rest on the supporting jaws 36 while the strippers 19 with mold half 17 and platen 12 return to their elevated position. This reciprocation of platen 12 in the mold-open position has been indicated by dotted lines in the top graph. For still more positive guidance, obviating any need for interruption of the cooling-air flow, cores 18 could be lowered into the nests 51 during this loading process, with subsequent upward withdrawal relative to strippers 19 to release the still deformable parisons from the neck rings 19'. In either case, the grippers 38 begin to close around the relatively thin-walled and therefore already solidified necks of the parisons immediately upon their release.

The mold closes at a time $t_2$ even as the neck rings 19' resume their normal position facilitating their entry into recesses 15' (FIG. 1). The withdrawal of the transfer box 24 from the mold gap is completed upon the start of the mold-closing stroke.

Near the end of the cycle, at a time $t_3$, the parisons or preforms 23 stored in transfer box 24 have become sufficiently rigid to be discharged from their nests into the waiting receptacles 53 of conveyor 52. At this instant, therefore, gripper jaws 38 are reopened along with supporting jaws 36 so that the parisons leave the transfer box via apertures 54 under their own weight. Shortly thereafter, at a time $t_4$, bottom jaws 36 are reclosed preparatorily to the reception of a new load of parisons in the next cycle beginning again at an instant $t_0$.

In practice, the length of a cycle may be about 20 seconds, with the mold remaining open for approximately one-tenth of that time.

Figure 4:
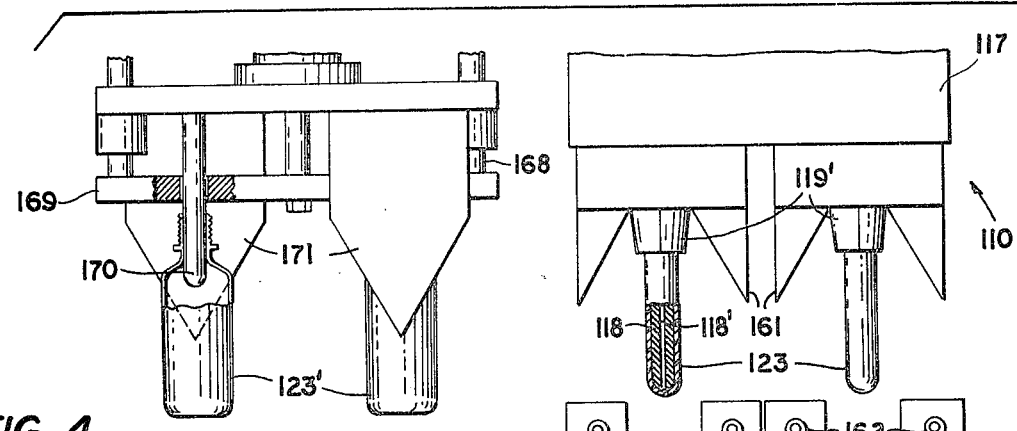
FIG. 4 is a view analogous to FIG. 1 but showing a combined injection/blow-molding machine according to our invention.
Figure 5:
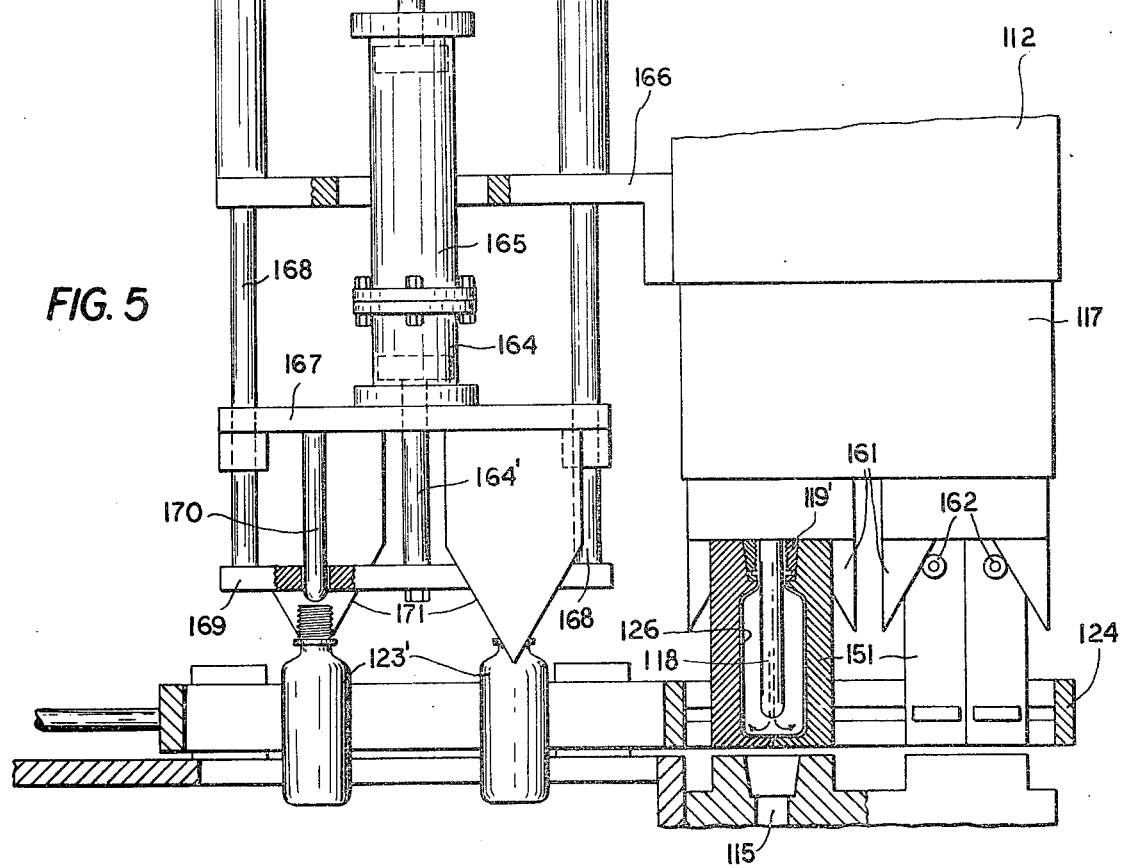
FIGS. 5 and 6 are views similar to FIG. 4, showing other phases in the operation of this machine.
Figure 6:
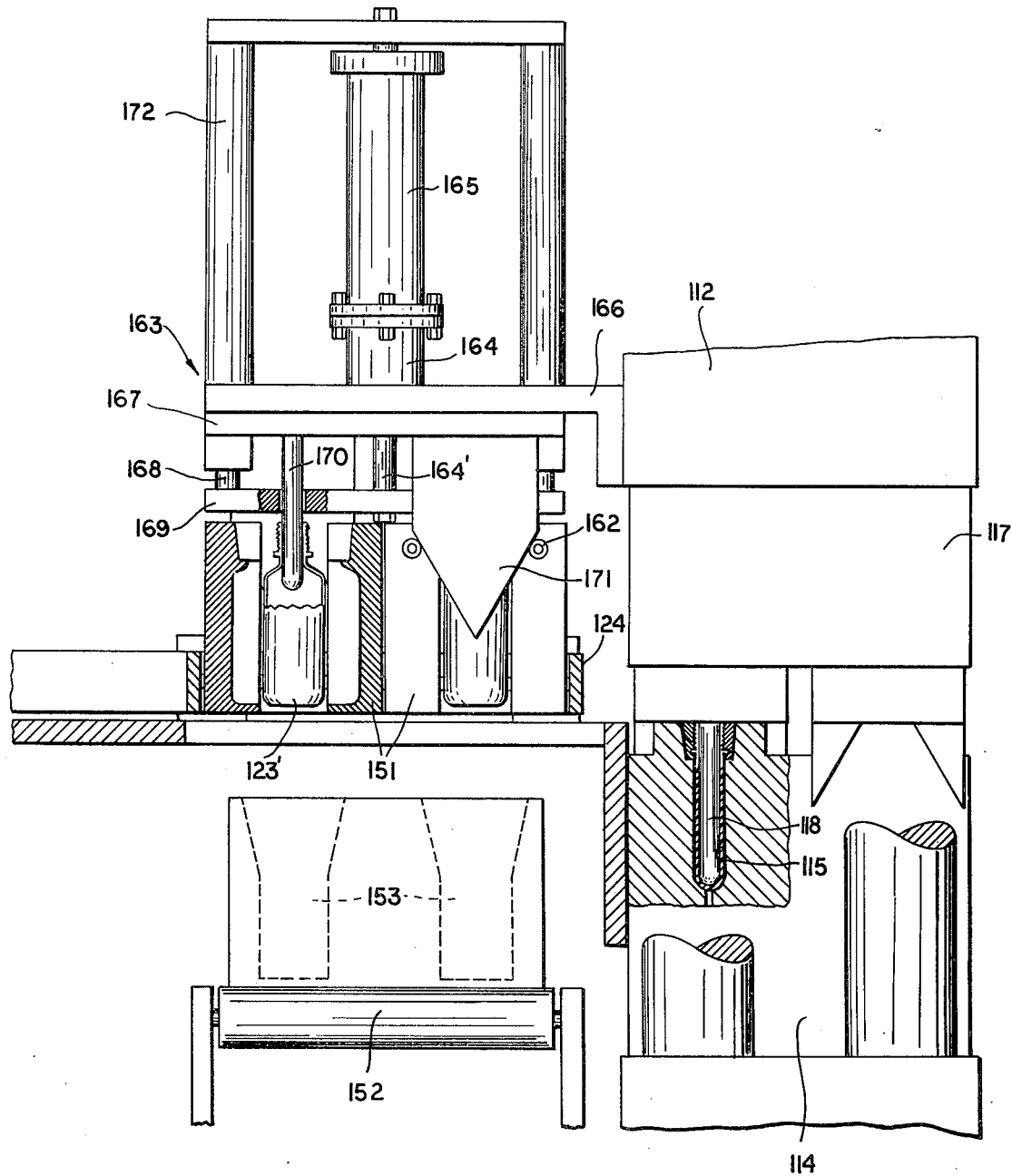

In FIGS. 4-6 we have shown a modification of the system of FIGS. 1 and 2 designed to let the blow-molding step take place in the injection-molding machine itself rather than at a remote station. While this extends the operating cycle of the machine, it eliminates all the intermediate steps of cooling, transportation, possible interim storage and reheating referred to above.

The molding machine 110 illustrated in FIGS. 4-6 differs from the machine 10 of FIGS. 1 and 2 in that its cores 118 are hollow, each core being provided with an axial bore 118' connected to a source of high-pressure fluid (preferably air) which could be the blower 28 of FIG. 2 and which is controlled by the associated programmer, e.g. with the aid of damper 30, to pressurize the bore 118' only during a small fraction of a cycle.

The upper, movable mold half 117 is provided with pairs of downwardly diverging camming lugs 161 cooperating with rollers 162 on respective half-shells 151 which are slidably supported on a carriage 124 and constitute as many split blow molds (here twelve) as there are cavities 115 in the lower mold half 114. In their closure position, illustrated in FIG. 5, the half-shells 151 form cells 126 for the expansion of a preform or parison 123 adhering to the corresponding core 118. The twelve molds are arrayed in two rows, the half-shells of each row being integrated into two elongate banks whose horizontal outline is similar to that of jaws 38 as seen in FIG. 2.

Carriage 124 is horizontally reciprocable, in a manner similar to that of transfer box 24 in the preceding embodiment, by a pneumatic jack 125 for insertion into and withdrawal from the gap formed between the separated mold halves 114 and 117. In its withdrawn position, illustrated in FIG. 6, carriage 124 is aligned with an unloader 163 comprising a pair of pneumatic jacks 164, 165 mounted back to back and carried on a shelf 166, rigid with movable platen 112, for vertical reciprocation along with mold half 117. Jack 164 is fastened to a plate 167 which is slidably guided on rods 168 welded to shelf 166. Rods 168 support a stripper plate 169 which is secured to the piston 164' of jack 164 and is traversed by extractor pins 170 depending from plate 167. Plate 167 also carries, at opposite ends of each row of six pins 170, a pair of downwardly converging camming wedges 171 designed to coact with the rollers 162 of respective blow molds to separate their half-shells 151 for facilitating the removal of bottles 123' formed from the parisons 123. The connection between jacks 164, 165 and shelf 166 comprises a yoke 172 which is rigid with that shelf and is fastened to the piston 165' of jack 165.

FIG. 4 shows the phase of an operating cycle (analogous to that of FIG. 1) in which the injection mold 114, 117 has been opened and carriage 124 has been introduced into its gap to align respective blow molds with the raised cores 118. At this point the half-shells 151 of each blow mold are separated to enable the insertion of cores 118 together with neck rings 119'. Since the blow molds lie at a higher level than the cavities 115 (FIG. 5), platen 112 and mold portion 117 do not descend as far as during a mold-closing stroke in introducing the cores 118 into the blow molds. This descent brings the camming lugs 161 into engagement with the cam-follower rollers 162 to move the associated half-shells 151 into firm contact with each other whereby the blow molds close around the parisons 123 and the neck rings 119'; see FIG. 5. At this point the associated programmer (45 in FIG. 1) admits air under pressure to the bores 118' of the cores 118 to inflate the parisons and expand them against the walls of cells 126, with maintenance of this pressure until the resulting bottles 123' have solidified sufficiently to maintain their shape.

Camming lugs 161 are mechanically linked with the support of cores 118 so that, upon the subsequent upward withdrawal of these cores relative to the strippers carrying the neck rings 119', the rollers 162 are disengaged to allow a separation of the half-shells 151 when the neck rings are opened at the end of the core withdrawal, as described above. The strippers are then elevated to extract the neck rings 119' from the blow molds whereupon the carriage 124 can be laterally withdrawn into the position of FIG. 6.

At the beginning of a new molding cycle, illustrated in FIG. 6, cores 118 descend into cavities 115 for the injection molding of a new set of parisons. At the same time, extractor pins 170 descend into the necks of bottles 123' for frictional engagement therewith; this engagement could be intensified by suction applied to the interior of the bottles by way of axial channels in these pins. The descent of carrier plate 166 has brought the camming wedges 171 into contact with cam-follower rollers 162 for a full separation of the half-shells 151. This enables the subsequent extraction of the bottles 123' from the blow molds as the unloader 163 elevates the pins 170 into the position of FIG. 4, preparatorily to the return of the empty and open blow molds to their working position in line with cores 118. Thereafter, concurrently with the blow-molding step illustrated in FIG. 5, stripper plate 169 is lowered with reference to carrier plate 167 to detach the bottles 123' from extractor pins 170, letting them drop into pockets 153 of a conveyor 152. With platen 112 in a partly descended position, and with jack 165 operated to lower the assembly of plates 167, 169 with reference to its position of FIG. 4, the bottles fall only through a short distance before landing with an upright orientation in these pockets.

the camming mechanism 161, 162, 171, serving to open and close the blow molds as illustrated in FIGS. 4-6, could be replaced by a fluidic actuator such as the jack 35 of FIG. 1 controlled by the associated programmer. Even with the arrangement illustrated, however, alternate banks of half-shells 151 are advantageously interconnected by cross-links such as those shown at 55 and 56 in FIG. 2.

If the separation of half-shells 151 in the position of FIG. 6 is sufficient to let the bottles 123' drop directly into the underlying conveyor pockets 153, the function of the extractor pins 170 would be only to hold the bottles centered during the splitting of the blow molds. In that case the stripper plate 169 could be omitted or, possibly, could be provided with dependent collars surrounding the pins 170 to detach the bottles from the pins, if necessary, after the blow molds have been fully opened.

The transfer box 24 of FIGS. 1 and 2 could also be used for directly transporting one or more parisons, preferably up to eight workpieces at a time, from the injection-molding machine to a blow-molding unit, without intervening cooling. Since blow molding can be carried out at less than half the time of an injection-molding cycle (i.e. within about 6 to 8 seconds), the group of parisons withdrawn from one section of a two-section molding machine could be conveyed to the blow-molding station while the other section forms a similar group of parisons, to be withdrawn thereafter by a second transfer box operating in alternation with the first one.

We claim:

1. In a system for producing hollow elongate workpieces of thermoplastic material, in combination:
   a vertical injection-molding machine including a lower mold portion provided with at least one cavity, an upper mold portion vertically separable from said lower mold portion and provided with at least one elongate hollow core depending into said cavity in a mold-closed position, and clamp means for relatively reciprocating said mold portions;
   a horizontally movable carriage at the level of a gap formed between said mold portions in a mold-open position;
   drive means synchronized with said clamp means for inserting said carriage into said gap in said mold-open position, said carriage being provided with at least one blow-molding cell split into half-shells and alignable with said core upon insertion into said gap for receiving a workpiece molded in said cavity and adhering to said core, said clamp means being programmed to lower said core with the adhering workpiece into the blow-molding cell aligned therewith;
   blowing means synchronized with said clamp means for admitting a high-pressure gas to the interior of the lowered core for inflating the workpiece in said blow-molding cell;
   first camming means on said upper mold portion engageable with coacting formations on said half-shells for holding said blow-molding cell closed until said core is retracted therefrom by said clamp means; and
   unloading means adjacent said injection-molding machine for removing the workpiece from said blow-molding cell upon lateral withdrawal of said carriage from said gap, said unloading means being provided with second camming means engageable with said coacting formations for separating said half-shells.

2. The combination defined in claim 1 wherein said unloading means comprises an extraction member lowerable into said blow-molding cell for engagement with the bottle contained therein, said member supporting said second camming means and being positively coupled with said upper mold portion for joint displacement by said clamp means.

* * * * *